US009635798B2

(12) United States Patent
Merx et al.

(10) Patent No.: US 9,635,798 B2

(45) Date of Patent: May 2, 2017

(54) ARRANGEMENT FOR AUTOMATICALLY STEERING A COMBINATION OF A SELF-PROPELLED VEHICLE AND AN IMPLEMENT FOR CULTIVATING A FIELD

(71) Applicant: Deere & Company, Moline, IL (US)

(72) Inventors: Stephan Merx, Partenheim (DE); Nicolas Germann, Waldfischbach (DE)

(73) Assignee: DEERE & COMPANY, Moline, IL (US)

( * ) Notice: Subject to any disclaimer, the term of this patent is extended or adjusted under 35 U.S.C. 154(b) by 175 days.

(21) Appl. No.: 13/631,022

(22) Filed: Sep. 28, 2012

(65) Prior Publication Data

US 2013/0110358 A1 May 2, 2013

(30) Foreign Application Priority Data

Oct. 26, 2011 (DE) ........................ 10 2011 085 244

(51) Int. Cl.
*A01B 69/00* (2006.01)
*A01B 69/08* (2006.01)

(52) U.S. Cl.
CPC .................................. *A01B 69/006* (2013.01)

(58) Field of Classification Search
None
See application file for complete search history.

(56) References Cited

U.S. PATENT DOCUMENTS 4,433,533 A 2/1984 Giani
4,463,811 A * 8/1984 Winter ........................... 172/26
6,434,462 B1 * 8/2002 Bevly et al. .................... 701/50
6,553,925 B1 * 4/2003 Beaujot ........................... 111/14
6,688,403 B2 2/2004 Bernhardt et al.
6,804,587 B1 * 10/2004 O Connor et al. ............. 701/26
6,865,465 B2 3/2005 McClure
7,147,241 B2 12/2006 Beaujot et al.
7,162,348 B2 1/2007 McClure et al.
7,373,231 B2 5/2008 McClure et al.
7,383,114 B1 6/2008 Lange et al.
7,580,783 B2 8/2009 Dix
7,689,354 B2 3/2010 Heiniger et al.
7,784,558 B2 8/2010 Mozingo
7,860,628 B2 * 12/2010 Lange ................... G01C 21/20 342/357.2

(Continued)

FOREIGN PATENT DOCUMENTS

DE 102009028409 2/2011
DE 102010041885 A1 4/2012

(Continued)

OTHER PUBLICATIONS

European Search Report, dated Feb. 27, 2013 (4 pages).

*Primary Examiner* — John R Olszewski
*Assistant Examiner* — James M McPherson
(74) *Attorney, Agent, or Firm* — Yee & Associates, P.C.

(57) ABSTRACT

An implement for cultivating a field is connected to a self-propelled vehicle that is steered automatically along a first reference path by a steering control unit. The implement is guided in a lateral direction with respect to the vehicle along a second reference path by an implement position control unit by means of an actuator. The steering control unit steam the vehicle in dependence on the position of the actuator at the time.

8 Claims, 2 Drawing Sheets

(56) References Cited

U.S. PATENT DOCUMENTS

| | | | | |
|---|---|---|---|---|
| 7,904,226 | B2 | 3/2011 | Dix | |
| 8,131,432 | B2 | 3/2012 | Senneff et al. | |
| 8,190,364 | B2 | 5/2012 | Rekow | |
| 8,244,442 | B2 * | 8/2012 | Craig et al. | 701/70 |
| 8,346,443 | B2 | 1/2013 | Senneff et al. | |
| 8,359,141 | B1 | 1/2013 | Lange | |
| 8,565,984 | B2 | 10/2013 | Mayfield et al. | |
| 8,577,558 | B2 | 11/2013 | Mitchell | |
| 8,639,416 | B2 | 1/2014 | Jones et al. | |
| 8,649,930 | B2 | 2/2014 | Reeve et al. | |
| 2003/0208311 | A1 | 11/2003 | McClure | |
| 2004/0124605 | A1 | 7/2004 | McClure et al. | |
| 2009/0032273 | A1 | 2/2009 | Hahn | |
| 2010/0017075 | A1 * | 1/2010 | Beaujot | 701/50 |
| 2011/0093169 | A1 * | 4/2011 | Schroeder | A01D 41/1243 701/50 |
| 2011/0100657 | A1 | 5/2011 | Connors et al. | |
| 2011/0112721 | A1 | 5/2011 | Wang et al. | |
| 2012/0232760 | A1 | 9/2012 | Hubalek | |
| 2012/0240546 | A1 * | 9/2012 | Kormann | 56/344 |
| 2013/0046446 | A1 * | 2/2013 | Anderson | 701/50 |
| 2013/0186657 | A1 | 7/2013 | Kormann et al. | |

FOREIGN PATENT DOCUMENTS

| | | | |
|---|---|---|---|
| EP | 1266553 | A2 | 12/2012 |
| WO | 2008005195 | A2 | 1/2008 |
| WO | 2012041743 | A1 | 4/2012 |

* cited by examiner 10
12
14
14
16
16
18
18
20
22
24
26
28
30
32
34
36
38
40
42
44
46
48

ARRANGEMENT FOR AUTOMATICALLY STEERING A COMBINATION OF A SELF-PROPELLED VEHICLE AND AN IMPLEMENT FOR CULTIVATING A FIELD

RELATED APPLICATIONS

This document claims priority based on German Patent Application No. 102011085244.1, filed Oct. 26, 2011, which is hereby incorporated by reference into this document.

FIELD OF THE INVENTION

This invention relates to an arrangement for automatically steering a combination of a self-propelled vehicle and an implement for cultivating a field which is connected to the vehicle.

BACKGROUND ART

In agriculture there are numerous applications in which implements must be moved over a field by means of a self-propelled vehicle with the intention that the implements follow a desired reference path in order, for example, to harvest produce from a field, to cultivate the soil or to spread materials such as seed or fertilizer on a field. In the past the vehicle was steered by a driver for this purpose and the implement, attached rigidly to a three-point linkage or to a coupling of the towing vehicle by means of a draw-bar, followed the manually or automatically steered vehicle. However, it is not always possible to adhere precisely to the reference path of the implement because of the different movement paths of the vehicle and of the implement.

Furthermore, there have been proposed automatic arrangements (e.g., U.S. Pat. No. 6,865,465 B2 and U.S. Pat. Pub. No. 2011/0112721 A1) in which the vehicle is equipped with a satellite-based position determining system and is guided automatically on a reference path on the basis of the signals of the position determining system, while the implement is displaceable by an actuator in a lateral direction with respect to the vehicle and is likewise provided with a satellite-based position determining system. The actuator is activated on the basis of the signals of the position determining system in such a way that the implement is likewise moved on the reference path. U.S. Pat. No. 7,162,348 B2 describes a similar arrangement in which the vehicle is steered by its position determining system and the position of the implement with respect to the vehicle is finely adjusted by a position determining system of the implement and an associated, actuator.

SUMMARY

The disclosure relates to an arrangement for automatically steering a combination of a self-propelled vehicle and an implement for cultivating a field which is connected to the vehicle. In one embodiment, the arrangement comprises the self-propelled vehicle being equipped with a steering control unit for automatically steering the vehicle along a first reference path. The implement is displaceable in a lateral direction with respect to the vehicle by an actuator coupled to an implement position control unit; the implement is guidable along a second reference path, where the steering control unit is set up to steer the vehicle in dependence on the position of the actuator at the time.

BRIEF DESCRIPTION OF THE DRAWINGS

An exemplary embodiment of the invention which is described in more detail below is represented in the drawings, in which.

DESCRIPTION OF ILLUSTRATIVE EMBODIMENTS

Figure 1:
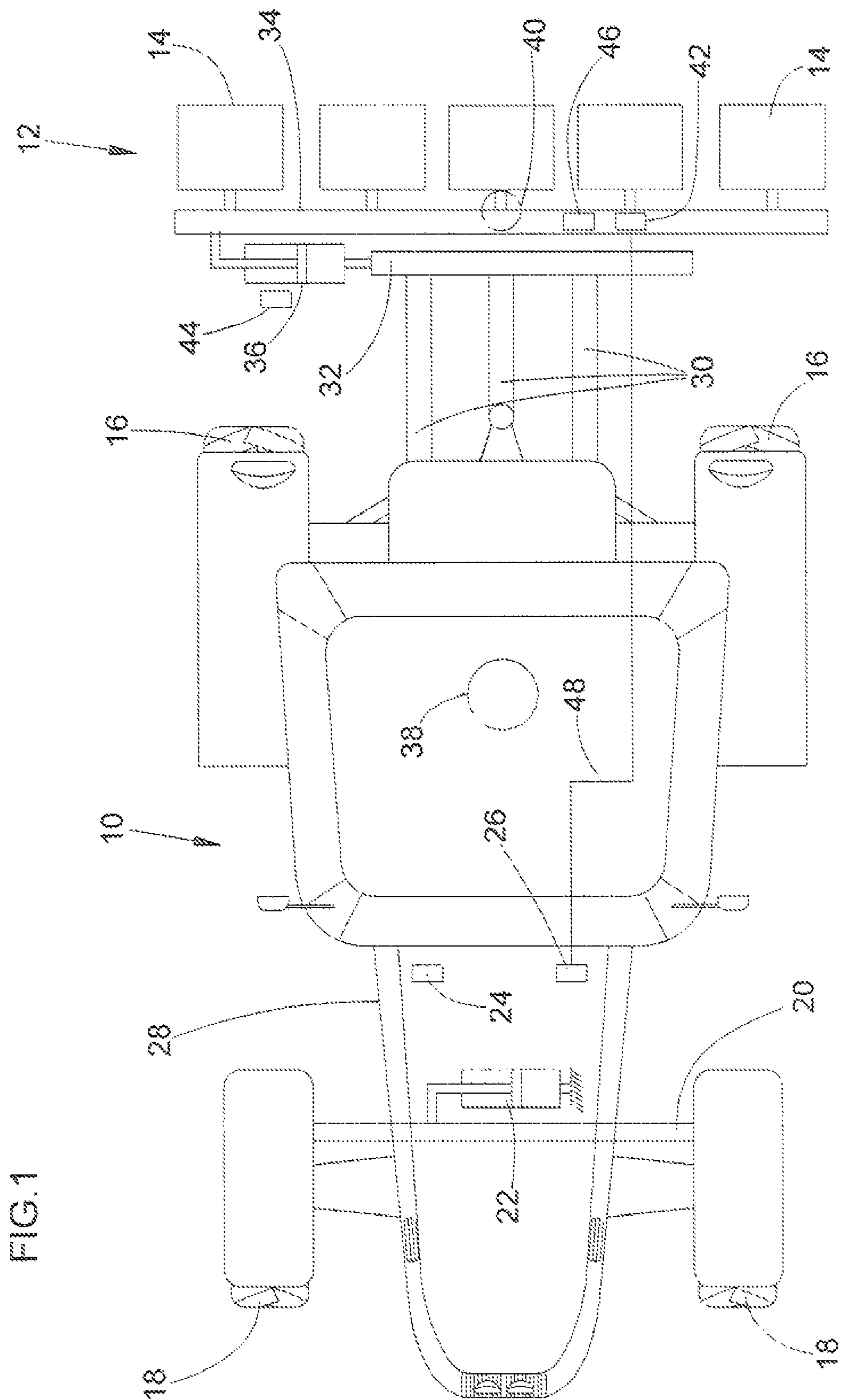
FIG. 1 is a top view of a vehicle with an Implement coupled thereto.

The disclosure relates to an arrangement for automatically steering a combination of a self-propelled vehicle and an implement for cultivating a field which is connected to the vehicle. In one embodiment, the self-propelled vehicle is equipped with a steering control unit for automatically steering the vehicle along a first reference path, while the implement is displaceable in a lateral direction with respect to the vehicle by an actuator coupled to an implement position control unit. The implement is guidable along a second reference path.

In certain prior art, the vehicle is maintained on its reference path by a position determining system and the implement is moved by its actuator in a lateral direction with respect to the vehicle in order to compensate for any deviations from the reference path. However, the adjustment travel of me implement is limited by mechanical properties of the actuator. For this reason, situations in which the adjustment travel of the implement is no longer sufficient to keep the implement on the reference path occur in some cases (for example when working on a lateral slope, which can cause the vehicle to be steered uphill as a result of slippage). The present disclosure is well suited to avoid such situations or at least to reduce their frequency.

An arrangement for automatically steering a combination of a self-propelled vehicle and an implement for cultivating a field which is connected to the vehicle comprises a steering control unit for automatically steering the vehicle along a first reference path and an implement position control unit with an actuator. The implement may be used, for example, to harvest produce from a field, to cultivate the soil or to spread materials such as seed or fertilizer on a field. The implement is displaceable in a lateral direction with respect to the vehicle by the actuator coupled to an implement position control unit and is guidable by the implement position control unit along a second reference path. The steering control unit steers the vehicle in dependence on the position of the actuator at the time. Accordingly, the position of the actuator and therefore of the implement with respect to the vehicle is also taken into account in generating the steering signals for the automatic steering of the vehicle. In this way, the arrangement avoids or prevents the situation where the actuator reaches its end position and the implement deviates from its (second) reference path.

The steering control unit can therefore steer the vehicle to the right as soon as the actuator has moved the implement to the right by more than a predetermined portion of its range of movement. Analogously, the steering control unit can steer the vehicle to the left as soon as the actuator has moved the implement to the left by more than a predetermined portion of its range of movement. The predetermined portion may be, for example, the whole range of movement or a part thereof, for example 90%. That would mean that the vehicle counter-steers as soon as the last 10% of the range of movement of the actuator to the left or to the right has teen reached. Since the vehicle usually reacts substantially more sluggishly than the actuator, the remaining 10% of the range of movement of the actuator can then be used as a reserve in order to be able to correct short-term deviations of the implement from its reference path during the tracking movement of the vehicle.

The first reference path will usually coincide with the second reference path. However, operating modes in which they deviate from one another are also possible, for example when turning at the end of a field, to move an implement toward an outside of a curve for the second reference path to prevent collisions between the vehicle and the implement (e.g., as set forth in German Patent Application DE 10 2010 041 885A1, which is hereby incorporated by reference into this document) or if the implement is to be moved over the field with a lateral offset with respect to the vehicle. Because situations in which it is undesirable for the vehicle to deviate from its first reference path are possible, for example to prevent it from travelling over parts of the field already cultivated, the coupling of the steering of the vehicle to the position of the actuator proposed here may be capable of being switched off. Preferably, therefore, a second mode of the steering control unit can be selected, in which mode the steering control unit moves the vehicle on the first path independently of the position of the actuator and activates the actuator in such a way that it guides the implement (within its range of movement) on the second reference path.

FIG. 1 shows a top view of a combination of a vehicle 10 and an implement 12. The vehicle 10 is self-propelled and is here in the form of an agricultural tractor. In the example shown the implement 12 is a seeder with a number of placement units 14 distributed across the width of the implement 12 for applying seed to the soil, although any other agricultural implements can also be used. The vehicle 10 comprises a chassis 28 with driveable rear wheels 16 and front wheels 18 which are steerable by means of a track rod 20 and a steering actuator 22 coupled thereto. The steering actuator 22 in the form of a hydraulic cylinder is controlled via a valve unit 24 and a steering control unit 26. If, contrary to the illustration in an alternate embodiment, the vehicle 10 were provided with rubber caterpillar tracks and steered via their speed difference, the steering actuator 22 would be a component of the speed control system of the rubber caterpillar tracks.

An implement mounting device 32 is fastened to a three-point linkage 30 with upper and lower arms mounted on the chassis 28, to which implement mounting device 32 a cross beam 34 is mounted displaceably by means of an actuator 36 in a lateral direction, that is transversely to the forward direction of the vehicle 10, which runs from right to left in FIG. 1. The cross beam 34 carries the placement units 14 of the implement 12.

Details of a possible embodiment of the implement mounting device 32 and of the cross beam 34 are disclosed in German Patent Application No. DE 10 2009 028 409 A1. (See, e.g., Abstract and FIG. 2 of German Patent Application No. DE 10 2009 028 409 A1.) The implement 12 might also be fastened to the vehicle 10 in any other way, for example via a draw-bar steerable by means of the actuator 36 or via blades engaging with the soil and steerable by means of the actuator 36, or via remotely actuated upper and lower arms of the three-point linkage 30. The implement 12 might also be arranged at the front of the vehicle 10 and optional further implements 12 rearwardly on each side of the vehicle 10.

The actuator 36 is controllable by an implement position control unit 42 via a valve unit 46 mounted on the implements. The valve unit 46 is supplied with pressurized fluid by the hydraulic system of the vehicle 10. The implement position control unit 42 detects the actual position of the actuator 36 via a sensor 44. The steering control unit 26 and the implement position control unit 42 are connected to one another to transmit data via a bus 48.

The steering control unit 26 receives position signals regarding the position of the vehicle 10 from a position determining system 38 of the vehicle 10 which is mounted on the roof of its cabin. The implement position control unit 42 receives position signals regarding the position of the implement 12 from a position determining system 40 of the implement 12 moving in a lateral direction with the cross beam 34 and mounted centrally thereon. Both position determining systems 38, 40 preferably Include receivers for position signals from satellites, such as the GPS, Galileo or GLONASS systems, and receivers for differential signals in order to enhance accuracy. Alternatively or additionally, the position determining system 38 might be equipped with a camera or another local sensor which provides signals for steering the vehicle 10. Analogously, the position determining system 40 might be supplemented or replaced by local sensors which detect, for example, the lateral position of the implement 12 with respect to the vehicle 10, or the position of the implement 12 is derived by the position determining system 40 by means of mathematical formulae from the distance travelled by the vehicle 10 (See, e.g., International Patent Application No. WO 2008/005195 A2,). It should also be noted that the steering control unit 26 and the implement position control unit 42 could be combined in a single unit; this also applies to the valve units 24 and 46.

Figure 2:
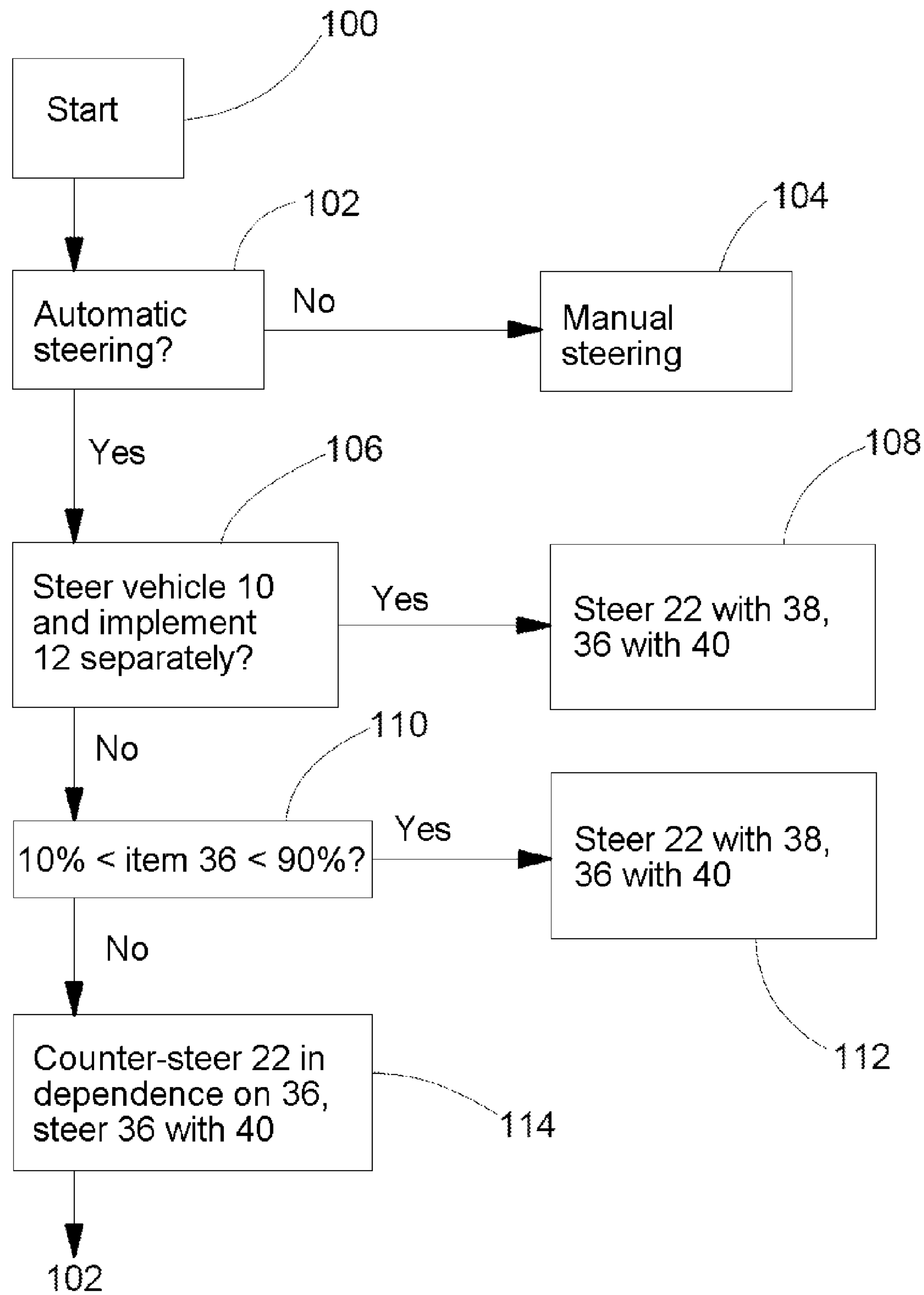
FIG. 2 is a flowchart according to which the steering control unit of the vehicle and of the implement operates.

FIG. 2 shows a flow chart of a method according to which the steering control unit 26 and the implement position control unit 42 operate.

The method of FIG. 2 starts in step 100, with the booting and initialising of the steering control unit 26 and of the implement position control unit 42. Step S100 is followed by step 102, in which it is interrogated whether automatic steering should take place. For this purpose an operator in the cabin of the vehicle 10 can operate a corresponding switch. Subsequently, the automatic steering is automatically switched off if the operator actuates a steering wheel. If the outcome of step 102 is that automatic steering should not take place, step 104 follows, in which the vehicle 10 is steered manually by means of a steering wheel or the like which cooperates electrically via the steering control unit 26 and/or hydraulically via the valve unit 24 with the steering actuator 22.

However, if the outcome of step 102 is that automatic steering should take place, step 106 follows, in which it is interrogated whether the vehicle 10 and the implement 12 are to be steered separately from one another. The operator of the vehicle 10 can therefore select (for example, via a switch or a suitable menu in an onboard computer system) whether a first mode (steps 110 to 114) applies or runs, in which the steering of the vehicle 10 and of the implement 12 are coupled to one another; or whether a second mode (step 108) applies or runs, in which they are not coupled to one another. The first mode makes it possible, even in problematic situations such as driving on a lateral slope or cultivating uneven fields, for the implement 12 to remain on its reference path, while the second mode ensures that the vehicle 10 remains on its reference path and therefore, for example, prevents areas of the field already driven over from being driven over a second time.

If the second mode has been selected in step 106, step 108 follows, in which the steering control unit 26 activates the steering actuator 22 via the valve unit 24 with reference to the signals of the position determining system 38 and to reference path information, present in the steering control unit 26, for the (first) reference path to be followed by the vehicle. This first reference path information may denote, for example, a curved or straight line along which the vehicle 10 is steered over the field. At the same time (or shortly beforehand or afterwards), the implement position control unit 42 activates the actuator 36 via the valve unit 46 with reference to the signals of the position determining system 40 and of reference path information, present in the implement position control unit 42, for the (second) reference path to be followed by the implement 12. This second reference path information may denote, for example, a curved or straight line along which the implement 12 is to be guided over the field, and as a rule is identical to the first reference path information, although it may deviate from it, for example, during the turning process in the headland.

In step 108, the steering actuator 22 is activated only on the basis of the first reference path information and the position signals of the position determining system 38, and the actuator 36 is activated only on the basis of the second reference path information and the position signals of the position determining system 40.

If step 106 results in selection of the first mode, step 110 follows, in which the implement position control unit 42 checks with reference to the signals of the sensor 44 whether the actuator 36 is within a predetermined portion of its range of movement which, in this embodiment corresponds to the middle 80% of the lateral displacement range of the actuator 36. If the actuator 36 is within this predetermined portion, sufficient scope for laterally displacing the implement 12 in both lateral directions is still available and step 112 follows, which coincides with the above-described step 108. Here too, therefore, the vehicle 10 and the implement 12 are steered or displaced laterally independently of one another.

If however, the outcome of step 110 is that the actuator 36 is within one of the outer limits (here 10% in each case) of its range of movement, step 114 follows. In this step the steering control unit 26 receives from the implement position control unit 42 via the bus 48 the instruction to counter-steer. This means that the steering control unit 26 is instructed to steer the vehicle 10 to the left if the actuator 36 is within the 10% of its range of movement on the left; that is to say that the implement 12 has approached its lower end position in FIG. 1. Analogously, the steering control unit 26 is instructed to steer the vehicle 10 to the right if the actuator 36 is within the 10% of its range of movement on the right; that is to say that the implement 12 has approached its upper end position in FIG. 1. In step 114, therefore, the implement position control unit 42 overrides in the steering control unit 26 the signals of the position determining arrangement 38 and the first reference path information. It is thereby achieved that the actuator 36 never (or at least only in substantially fewer cases than previously) reaches one of its end positions, from where it can no longer guide the implement 12 on the second reference path. In step 114 the actuator 36 continues to be activated in dependence on the second reference path information and on the signals of the position determining system 40, in which activation the anticipated reaction of the vehicle 10 to the instruction of the implement position control unit 42 to the steering control unit 26 can already be taken into account. Step 114 is again followed by step 102.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

LIST OF REFERENCE NUMBERS IN FIG. 1 and FIG. 2

10 Vehicle
12 Implement
14 Placement units
16 Rear wheels
18 Front wheels
20 Track rod
22 Steering actuator
24 Valve unit
26 Steering control unit
28 Chassis
30 Three-point linkage
32 Implement mounting device
34 Cross beam
36 Actuator
38 Position determining system
40 Position determining system
42 Implement position control unit
44 Sensor
46 Valve unit
48 Bus

The invention claimed is:

1. An arrangement for automatically steering a combination of a self-propelled vehicle and an implement for cultivating a field which is connected to the vehicle, the arrangement comprising:

the self-propelled vehicle being equipped with a steering control unit for automatically steering the vehicle along a first reference path;

a sensor for detecting an actual sensed position of an implement actuator;

the implement being displaceable in a lateral direction with respect to the vehicle by the implement actuator coupled to an implement position control unit, the implement being guidable along a second reference path, where in a first mode the steering control unit is set up to steer the vehicle in dependence on the sensed position of the implement actuator at a time such that the implement tracks the second reference path, wherein:

in the first mode the steering control unit receives an instruction from the implement position control unit to steer the vehicle to the right as soon as the implement actuator has moved the implement to the right by more than a predetermined portion of its range of movement and to steer the vehicle to the left as soon as the implement actuator has moved the implement to the left by more than a predetermined portion of its range of movement.

2. The arrangement according to claim 1, wherein the first reference path is identical to the second reference path.

3. The arrangement according to any one of claim 1, wherein the steering control unit can be transferred to a second mode in which it steers the vehicle independently of the position of the actuator.

4. The arrangement according to claim 1, wherein the steering control unit can be operated to activate a steering actuator of the vehicle with reference to signals of a position determining system for capturing the position of the vehicle and to reference path information regarding the first reference path to be followed by the vehicle.

5. The arrangement according to claim 1, wherein the implement position control unit can be operated to activate the actuator with reference to signals of a position determining system for capturing the position of the implement and to reference path information regarding the second reference path to be followed by the implement.

6. The arrangement according to claim 4, wherein the implement position control unit can be operated to override in the steering control unit, signals of the position determining arrangement, and the first reference path information in the event that the actuator has exceeded the predetermined portion of its range of movement.

7. A method for automatically steering a combination of a self-propelled vehicle and an implement for cultivating a field which is connected to the vehicle, the method comprising:

automatically steering the self-propelled vehicle along a first reference path by a steering control unit;

detecting an actual sensed position of an implement actuator;

guiding the implement in a lateral direction with respect to the vehicle along a second reference path by an implement position control unit by means of the implement actuator, where the steering control unit steers the vehicle in dependence on the sensed position of the implement actuator at a time such that the implement tracks the second reference path, wherein:

in a first mode, receiving by the steering control unit, from the implement position control unit, an instruction to steer the vehicle to the right as soon as the implement actuator has moved the implement to the right by more than a predetermined portion of its range of movement and to steering the vehicle to the left as soon as the implement actuator has moved the implement to the left by more than a predetermined portion of its range of movement.

8. The arrangement according to claim 1, wherein the first reference path is non-identical to the second reference path.

* * * * *